US010136390B2

(12) United States Patent
Diachina et al.

(10) Patent No.: US 10,136,390 B2
(45) Date of Patent: *Nov. 20, 2018

(54) READY TIMER PERIOD SPLITTING FOR EXTENDED COVERAGE GLOBAL SYSTEM FOR MOBILE COMMUNICATIONS (EC-GSM)

(71) Applicant: TELEFONAKTIEBOLAGET LM ERICSSON (PUBL), Stockholm (SE)

(72) Inventors: John Walter Diachina, Garner, NC (US); Paul Schliwa-Bertling, Ljungsbro (SE); Jens Bergqvist, Linköping (SE); Björn Hofström, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/489,458

(22) Filed: Apr. 17, 2017

(65) Prior Publication Data

US 2017/0222780 A1   Aug. 3, 2017

Related U.S. Application Data

(63) Continuation of application No. 15/160,962, filed on May 20, 2016, now Pat. No. 9,629,090.

(60) Provisional application No. 62/165,804, filed on May 22, 2015.

(51) Int. Cl.
| | | |
|---|---|---|
| *H04L 12/28* | (2006.01) |
| *H04W 52/02* | (2009.01) |
| *H04B 7/06* | (2006.01) |
| *H04L 1/16* | (2006.01) |
| *H04W 76/28* | (2018.01) |
| *H04L 1/18* | (2006.01) |
| *H04L 5/00* | (2006.01) |

(Continued)

(52) U.S. Cl.
CPC ...... *H04W 52/0235* (2013.01); *H04B 7/0623* (2013.01); *H04L 1/1678* (2013.01); *H04L 1/1887* (2013.01); *H04L 5/0055* (2013.01); *H04W 72/0413* (2013.01); *H04W 76/28* (2018.02); *Y02D 70/00* (2018.01); *Y02D 70/1224* (2018.01); *Y02D 70/1226* (2018.01); *Y02D 70/1262* (2018.01); *Y02D 70/146* (2018.01); *Y02D 70/21* (2018.01); *Y02D 70/24* (2018.01)

(58) Field of Classification Search
CPC .................................................. H04W 52/0235
USPC ................................ 370/278, 252, 329, 503
See application file for complete search history.

(56) References Cited

U.S. PATENT DOCUMENTS

| | | | |
|---|---|---|---|
| 2010/0284338 A1* | 11/2010 | Persson ................. | H04L 1/1664 370/328 |
| 2011/0243048 A1 | 10/2011 | Wang et al. | |
| 2012/0207045 A1 | 8/2012 | Pelletier et al. | |

(Continued)

FOREIGN PATENT DOCUMENTS

| | | |
|---|---|---|
| GB | 2 503 919 A | 1/2014 |
| RU | 2574610 C2 | 3/2014 |
| WO | 2014009894 A1 | 1/2014 |

*Primary Examiner* — John Pezzlo

(57) ABSTRACT

A core network node (e.g., Serving GPRS Support Node (SGSN)), a radio access network node (e.g., Base Station Subsystem), a wireless device, and various methods are described herein for splitting a period of a ready timer to allow for different periodicities of reachability for the wireless device.

22 Claims, 6 Drawing Sheets

(51) Int. Cl.
*H04W 72/04* (2009.01)
*H04J 1/16* (2006.01)

(56) References Cited

U.S. PATENT DOCUMENTS

2013/0107826 A1   5/2013   Dinan
2013/0322403 A1   12/2013  Diachina et al.
2016/0219561 A1*  7/2016   Bergqvist .......... H04W 72/0406
2016/0219564 A1*  7/2016   Bergqvist .......... H04W 72/0406

* cited by examiner

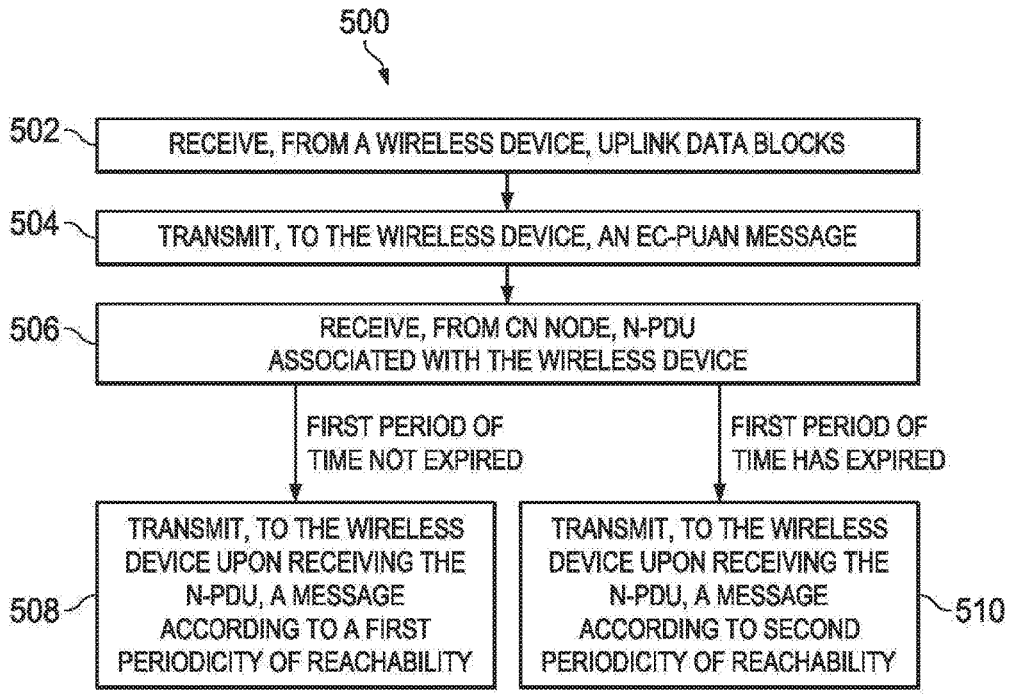
FIG. 5
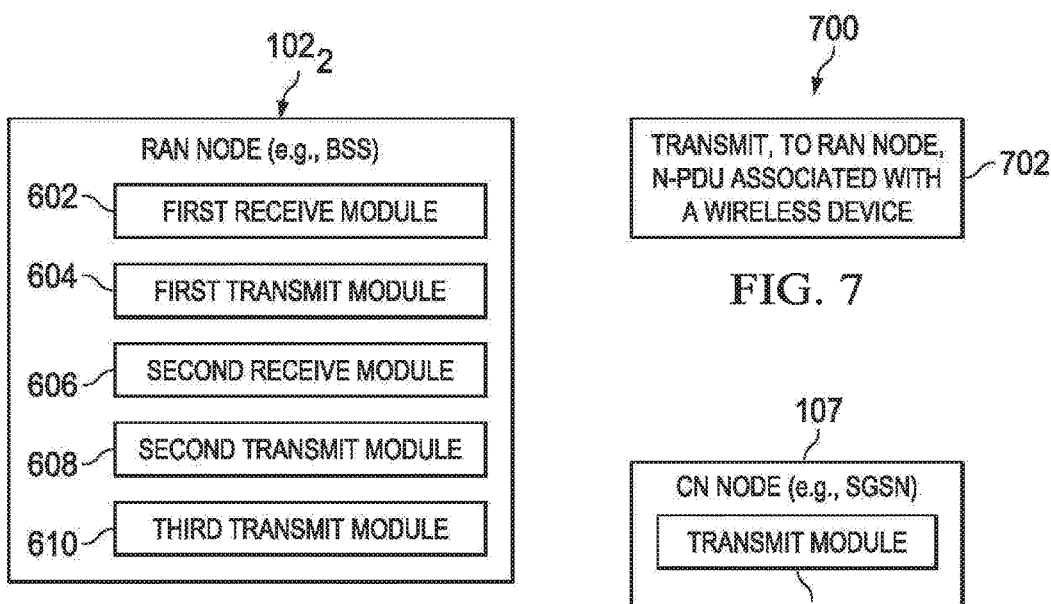
FIG. 6
FIG. 7
FIG. 8

US 10,136,390 B2

READY TIMER PERIOD SPLITTING FOR EXTENDED COVERAGE GLOBAL SYSTEM FOR MOBILE COMMUNICATIONS (EC-GSM)

CLAIM OF PRIORITY

This application is a continuation of U.S. patent application Ser. No. 15/160,962, filed on 20 May 2016, now U.S. Pat. No. 9,629,090, which claimed the benefit of U.S. Provisional Application Ser. No. 62/165,804, filed 22 May 2015. The entire contents of U.S. patent application Ser. No. 15/160,962 and U.S. Provisional Application Ser. No. 62/165,804 are incorporated by reference herein for all purposes.

TECHNICAL FIELD

The present disclosure relates generally to radio transmission and reception of network nodes (e.g., radio access network (RAN) nodes, core network (CN) nodes) and wireless devices and, more particularly, to techniques for splitting a period of a ready timer to allow for different periodicities of reachability for a wireless device in extended coverage.

BACKGROUND

The following abbreviations and terms are herewith defined, at least some of which are referred to within the following description of the present disclosure.
3GPP 3rd-Generation Partnership Project
AGCH Access Grant Channel
ASIC Application Specific Integrated Circuit
BLER Block Error Rate
BSS Base Station Subsystem
CC Coverage Class
CN Core Network
EC-GSM Extended Coverage Global System for Mobile Communications
EC-PCH Extended Coverage Paging Channel
eDRX Extended Discontinuous Receive
eNB Evolved Node B
DL Downlink
DSP Digital Signal Processor
EDGE Enhanced Data rates for GSM Evolution
EGPRS Enhanced General Packet Radio Service
GSM Global System for Mobile Communications
GERAN GSM/EDGE Radio Access Network
GPRS General Packet Radio Service
HARQ Hybrid Automatic Repeat Request
iDRX Intermediate Discontinuous Receive
IMSI International Mobile Subscriber Identity
IoT Internet of Things
LLC Link Layer Control
LTE Long-Term Evolution
MAR Mobile Autonomous Report
MCS Modulation and Coding Scheme
MME Mobility Management Entity
MS Mobile Station
MTC Machine Type Communications
NB Node B
N-PDU Network Protocol Data Unit
PCH Paging Channel
PDN Packet Data Network
PDTCH Packet Data Traffic Channel
PDU Protocol Data Unit
RACH Random Access Channel
RAN Radio Access Network
RAT Radio Access Technology
RTP1 Ready Timer Period 1
RTP2 Ready Timer Period 2
SGSN Serving GPRS Support Node
TDMA Time Division Multiple Access
TS Technical Specifications
UE User Equipment
WCDMA Wideband Code Division Multiple Access
WiMAX Worldwide Interoperability for Microwave Access
   Coverage Class (CC): At any point in time a wireless device belongs to a specific uplink/downlink coverage class that corresponds to either the legacy radio interface performance attributes that serve as the reference coverage for legacy cell planning (e.g., a Block Error Rate of 10% after a single radio block transmission on the PDTCH) or a range of radio interface performance attributes degraded compared to the reference coverage (e.g., up to 20 dB lower performance than that of the reference coverage). Coverage class determines the total number of blind transmissions to be used when transmitting/receiving radio blocks. An uplink/downlink coverage class applicable at any point in time can differ between different logical channels. Upon initiating a system access a wireless device determines the uplink/downlink coverage class applicable to the RACH/AGCH based on estimating the number of blind transmissions of a radio block needed by the BSS (radio access network node) receiver/wireless device receiver to experience a BLER (block error rate) of approximately 10%. The BSS determines the uplink/downlink coverage class to be used by a wireless device on the assigned packet channel resources based on estimating the number of blind transmissions of a radio block needed to satisfy a target BLER and considering the number of HARQ retransmissions (of a radio block) that will, on average, be needed for successful reception of a radio block using that target BLER. Note: a wireless device operating with radio interface performance attributes corresponding to the reference coverage (normal coverage) is considered to be in the best coverage class (i.e., coverage class 1) and therefore does not make any additional blind transmissions subsequent to an initial blind transmission. In this case, the wireless device may be referred to as a normal coverage wireless device. In contrast, a wireless device operating with radio interface performance attributes corresponding to an extended coverage (i.e., coverage class greater than 1) makes multiple blind transmissions. In this case, the wireless device may be referred to as an extended coverage wireless device. Multiple blind transmissions corresponds to the case where N instances of a radio block are transmitted consecutively using the applicable radio resources (e.g., the paging channel) without any attempt by the transmitting end to determine if the receiving end is able to successfully recover the radio block prior to all N transmissions. The transmitting end does this in attempt to help the receiving end realize a target BLER performance (e.g., target BLER ≤10% for the paging channel).
   eDRX cycle: eDiscontinuous reception (eDRX) is a process of a wireless device disabling its ability to receive when it does not expect to receive incoming messages and enabling its ability to receive during a period of reachability when it anticipates the possibility of message reception. For eDRX to operate, the network coordinates with the wireless device regarding when instances of reachability are to occur. The wireless device will therefore wake up and enable message reception only during pre-scheduled periods of reachability. This process reduces the power consumption which extends the battery life of the wireless device and is sometimes called (deep) sleep mode.

iDRX cycle: iDRX cycle determines the frequency with which a wireless device is reachable and a method for determining the specific radio blocks the wireless device reads to realize this reachability. The iDRX cycle is used upon returning to an idle mode and is only applicable while the ready timer is running. When the ready timer expires the wireless device reverts back to using the eDRX value it negotiated with the SGSN (using Non-Access Stratum (NAS) signalling).

Extended Coverage: The general principle of extended coverage is that of using blind transmissions for the control channels and for the data channels to realize a target block error rate performance (BLER) for the channel of interest. In addition, for the data channels the use of blind transmissions assuming MCS-1 (i.e., the lowest modulation and coding scheme (MCS) supported in EGPRS today) is combined with HARQ retransmissions to realize the needed level of data transmission performance. Support for extended coverage is realized by defining different coverage classes. A different number of blind transmissions are associated with each of the coverage classes wherein extended coverage is associated with coverage classes for which multiple blind transmissions are needed (i.e., a single blind transmission is considered as the reference coverage). The number of total blind transmissions for a given coverage class can differ between different logical channels.

Internet of Things (IoT) devices: The Internet of Things (IoT) is the network of physical objects or "things" embedded with electronics, software, sensors, and connectivity to enable objects to exchange data with the manufacturer, operator and/or other connected devices based on the infrastructure of the International Telecommunication Union's Global Standards Initiative. The Internet of Things allows objects to be sensed and controlled remotely across existing network infrastructure creating opportunities for more direct integration between the physical world and computer-based systems, and resulting in improved efficiency, accuracy and economic benefit. Each thing is uniquely identifiable through its embedded computing system but is able to interoperate within the existing Internet infrastructure. Experts estimate that the IoT will consist of almost 50 billion objects by 2020.

Cellular Internet of Things (CIoT) devices: CIoT devices are IoT devices that establish connectivity using cellular networks.

Nominal Paging Group: The specific set of EC-PCH blocks a device monitors once per eDRX cycle. The device determines this specific set of EC-PCH blocks using an algorithm that takes into account its IMSI, its eDRX cycle length and its downlink coverage class.

Ready Timer: A timer started at a wireless device upon determining it has successfully transmitted a LLC PDU and started at the SGSN upon receiving a LLC PDU from that wireless device (i.e., the SGSN maintains device specific Ready Timer values).

An EC-GSM wireless device upon completing an uplink transmission will receive from the network (RAN node) an Extended Coverage Packet Uplink Ack/Nack (EC-PUAN) message which indicates that all the uplink data blocks have been received by the network (RAN node). The EC-PUAN message may also include an indicator which indicates that the EC-GSM wireless device is to enter an EC-GSM Idle mode or an EC-GSM Extended Uplink Temporary Block Flow (TBF) mode. In either mode, the EC-GSM wireless device will remain reachable for the remaining period of a ready timer, which was started after the EC-GSM wireless device's most recent successful transmission of an uplink LLC PDU (i.e., the most recent uplink transmission is confirmed by the EC-PUAN). However, the EC-GSM wireless device remaining reachable per the same periodicity of reachability (e.g., iDRX cycle length of 8 51-multiframes (~1.9 seconds)) for the remaining period of the ready timer can be problematic given the battery-limited nature of the EC-GSM wireless device. This problem is addressed by the present disclosure.

SUMMARY

A wireless device (e.g., EC-GSM wireless device), a RAN node (e.g., BSS), a CN node (e.g., SGSN), and various methods for addressing the aforementioned problem are described in the independent claims. Advantageous embodiments of the wireless device (e.g., EC-GSM wireless device), the RAN node (e.g., BSS), the CN node (e.g., SGSN), and various methods are further described in the dependent claims.

In one aspect, the present disclosure provides a wireless device that comprises a processor and a memory that stores processor-executable instructions, wherein the processor interfaces with the memory to execute the processor-executable instructions, whereby the wireless device is operable to perform a transmit operation, a receive operation, a first implement operation, and a second implement operation. In the transmit operation, the wireless device transmits uplink data blocks. In the receive operation, the wireless device receives an EC-PUAN message. In the first implement operation, the wireless device upon receipt of the EC-PUAN message implements a first periodicity of reachability for a first period of time. In the second implement operation, the wireless device after the first period of time implements a second periodicity of reachability for a second period of time, wherein the first periodicity of reachability is more frequent than the second periodicity of reachability, and wherein a sum of the first period of time and the second period of time is equal to a period of a ready timer. An advantage of the wireless device implementing these operations is that it helps to reduce the battery consumption of the wireless device when compared to the legacy case where there is just one periodicity of reachability (similar to the first periodicity of reachability of the present disclosure) during the period of the ready timer.

In another aspect, the present disclosure provides a method in a wireless device where the method comprises a transmitting step, a receiving step, a first implementing step, and a second implementing step. In the transmitting step, the wireless device transmits uplink data blocks. In the receiving step, the wireless device receives an EC-PUAN message. In the first implementing step, the wireless device upon receipt of the EC-PUAN message implements a first periodicity of reachability for a first period of time. In the second implementing step, the wireless device after the first period of time implements a second periodicity of reachability for a second period of time, wherein the first periodicity of reachability is more frequent than the second periodicity of reachability, and wherein a sum of the first period of time and the second period of time is equal to a period of a ready timer. An advantage of the wireless device implementing these steps is that it helps to reduce the battery consumption of the wireless device when compared to the legacy case where there is just one periodicity of reachability (similar to the first periodicity of reachability of the present disclosure) during the period of the ready timer.

In one aspect, the present disclosure provides a RAN node configured to interact with a wireless device and a CN node. The RAN node comprises a processor and a memory that stores processor-executable instructions, wherein the processor interfaces with the memory to execute the processor-executable instructions, whereby the RAN node is operable to perform a first receive operation, a first transmit operation, a second receive operation, a second transmit operation, and a third transmit operation. In the first receive operation, the RAN node receives uplink data blocks from the wireless device. In the first transmit operation, the RAN node transmits to the wireless device an EC-PUAN message which confirms receipt of the uplink data blocks. In the second receive operation, the RAN node receives from the CN node an N-PDU which is associated with the wireless device. In the second transmit operation, the RAN node transmits, in response to the received N-PDU, a message to the wireless device according to a first periodicity of reachability for the wireless device using one of multiple transmission opportunities available until a first period of time of a ready timer has elapsed. In the third transmit operation, the RAN node transmits, in response to the received N-PDU, a message to the wireless device according to a second periodicity of reachability for the wireless device after the first period of time of a ready timer has elapsed and using one of multiple transmission opportunities available until a second period of time of the ready timer has elapsed. An advantage of the RAN node implementing these operations is that it helps to reduce the battery consumption of the wireless device when compared to the legacy case where there is just one periodicity of reachability (similar to the first periodicity of reachability of the present disclosure) during the period of the ready timer.

In another aspect, the present disclosure provides a method implemented in a RAN node configured to interact with a wireless device and a CN node. The method comprises a first receiving step, a first transmitting step, a second receiving step, a second transmitting step, and a third transmitting step. In the first receiving step, the RAN node receives uplink data blocks from the wireless device. In the first transmitting step, the RAN node transmits to the wireless device an EC-PUAN message which confirms receipt of the uplink data blocks. In the second receiving step, the RAN node receives from the CN node an N-PDU which is associated with the wireless device. In the second transmitting step, the RAN node transmits, in response to the received N-PDU, a message to the wireless device according to a first periodicity of reachability for the wireless device using one of multiple transmission opportunities available until a first period of time of a ready timer has elapsed. In the third transmitting step, the RAN node transmits, in response to the received N-PDU, a message to the wireless device according to a second periodicity of reachability for the wireless device after the first period of time of a ready timer has elapsed and using one of multiple transmission opportunities available until a second period of time of the ready timer has elapsed. An advantage of the RAN node implementing these steps is that it helps to reduce the battery consumption of the wireless device when compared to the legacy case where there is just one periodicity of reachability (i.e., similar to the first periodicity of reachability of the present disclosure).

Additional aspects of the present disclosure will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the present disclosure.

BRIEF DESCRIPTION OF THE DRAWINGS

A more complete understanding of the present disclosure may be obtained by reference to the following detailed description when taken in conjunction with the accompanying drawings:

FIG. 5 is a flowchart of a method implemented in the RAN node in accordance with an embodiment of the present disclosure;

FIG. 6 is a block diagram illustrating an exemplary structure of the RAN node in accordance with an embodiment of the present disclosure;

FIG. 7 is a flowchart of a method implemented in the CN node in accordance with an embodiment of the present disclosure; and, FIG. 8 is a block diagram illustrating an exemplary structure of the CN node in accordance with an embodiment of the present disclosure.

DETAILED DESCRIPTION

Figure 1:
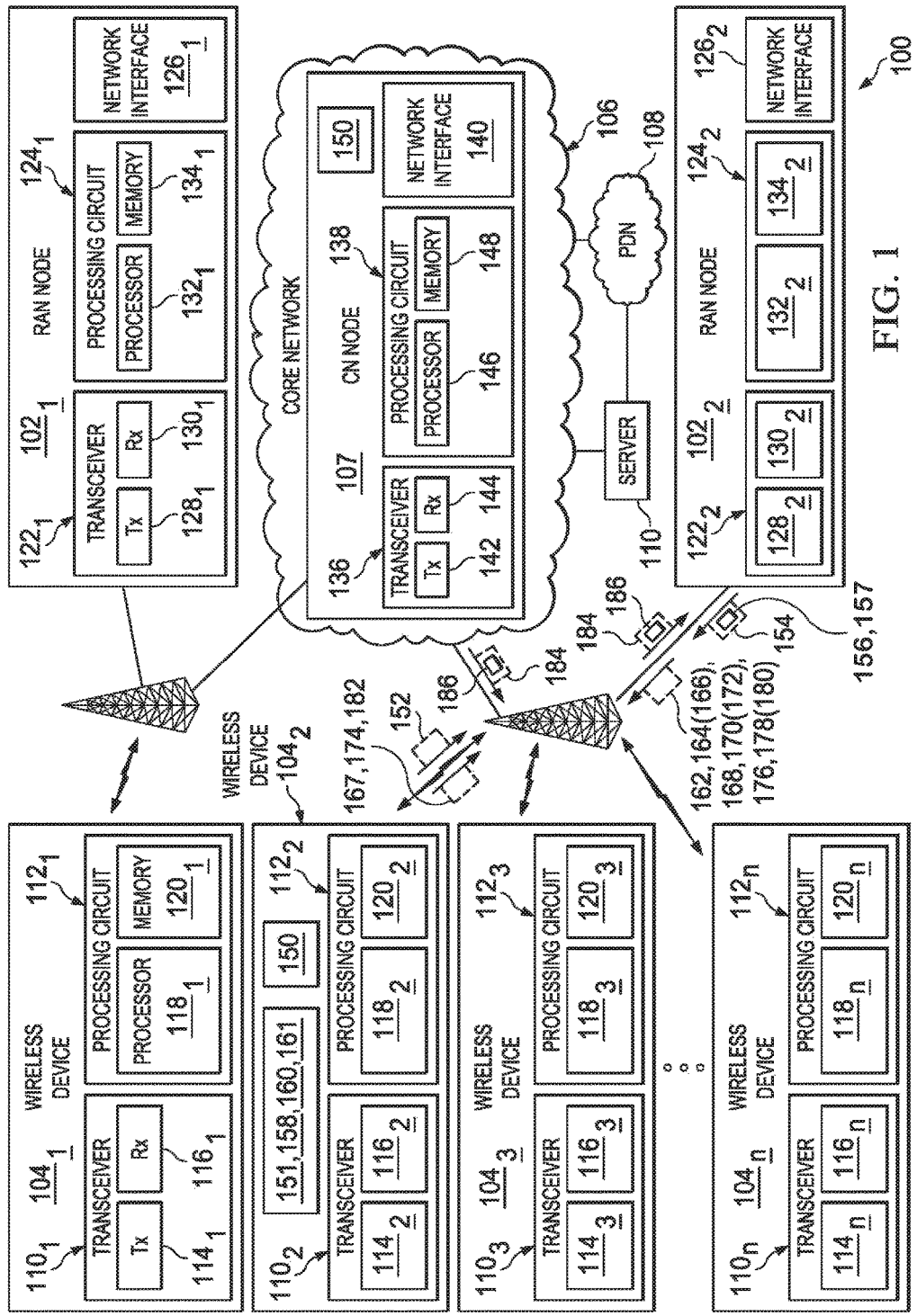
FIG. 1 is a diagram of an exemplary wireless communication network which includes a CN node, multiple RAN nodes, and multiple wireless devices which are all configured in accordance with an embodiment of the present disclosure.

A discussion is first provided herein to describe an exemplary wireless communication network that includes a CN node (e.g., SGSN), multiple RAN nodes (e.g., BSSs), and multiple wireless devices (e.g., EC-GSM wireless devices) which are all configured in accordance with an embodiment of the present disclosure (see FIG. 1). Then, a discussion is provided to disclose the ready timer splitting technique that the CN node (e.g., SGSN), the RAN nodes (e.g., BSSs), and the wireless devices (e.g., EC-GSM wireless devices) can implement to reduce the battery usage requirements of the wireless devices in accordance with various embodiments of the present disclosure (see FIG. 2). Thereafter, a discussion is provided to explain the basic functionalities-configurations on the CN node (e.g., SGSN), the RAN nodes (e.g., BSSs), and the wireless devices (e.g., EC-GSM wireless devices) in accordance with different embodiments of the present disclosure (see FIGS. 3A-3B, 4-8).

Exemplary Wireless Communication Network 100

Referring to FIG. 1, there is illustrated an exemplary wireless communication network 100 in accordance with the present disclosure. The wireless communication network 100 includes a core network 106 (which comprises at least one CN node 107) and multiple RAN nodes $102_1$ and $102_2$ (only two shown) which interface with multiple wireless devices $104_1$, $104_2$, $104_3$ . . . $104_n$. The wireless communication network 100 also includes many well-known components, but for clarity, only the components needed to describe the features of the present disclosure are described herein. Further, the wireless communication network 100 is described herein as being a GSM/EGPRS wireless communication network 100 which is also known as an EDGE wireless communication network 100. However, those skilled in the art will readily appreciate that the techniques of the present disclosure which are applied to the GSM/EGPRS wireless communication network 100 are generally applicable to other types of wireless communication systems, including, for example, WCDMA, LTE, and WiMAX systems.

The wireless communication network 100 includes the RAN nodes $102_1$ and $102_2$ (wireless access nodes-only two shown) which provide network access to the wireless devices $104_1$, $104_2$, $104_3$ . . . $104_n$. In this example, the RAN node $102_1$ is providing network access to wireless device $104_1$ while the RAN node $102_2$ is providing network access to wireless devices $104_2$, $104_3$ . . . $104_n$. The RAN nodes $102_1$ and $102_2$ are connected to the core network 106 (e.g., SGSN core network 106) and, in particular, to the CN node 107 (e.g., SGSN 107). The core network 106 is connected to an external packet data network (PDN) 108, such as the Internet, and a server 110 (only one shown). The wireless devices $104_1$, $104_2$, $104_3$ . . . $104_n$ may communicate with one or more servers 110 (only one shown) connected to the core network 106 and/or the PDN 108.

The wireless devices $104_1$, $104_2$, $104_3$ . . . $104_n$ may refer generally to an end terminal (user) that attaches to the wireless communication network 100, and may refer to either a MTC device (e.g., a smart meter) or a non-MTC device. Further, the term "wireless device" is generally intended to be synonymous with the term mobile device, mobile station (MS), "User Equipment," or UE, as that term is used by 3GPP, and includes standalone wireless devices, such as terminals, cell phones, smart phones, tablets, cellular IoT devices, IoT devices, and wireless-equipped personal digital assistants, as well as wireless cards or modules that are designed for attachment to or insertion into another electronic device, such as a personal computer, electrical meter, etc.

Likewise, unless the context clearly indicates otherwise, the term RAN node $102_1$ and $102_2$ (wireless access node $102_1$ and $102_2$) is used herein in the most general sense to refer to a base station, a wireless access node, or a wireless access point in a wireless communication network 100, and may refer to RAN nodes $102_1$ and $102_2$ that are controlled by a physically distinct radio network controller as well as to more autonomous access points, such as the so-called evolved Node Bs (eNodeBs) in Long-Term Evolution (LTE) networks.

Each wireless device $104_1$, $104_2$, $104_3$ . . . $104_n$ may include a transceiver circuit $110_1$, $110_2$, $110_3$ . . . $110_n$ for communicating with the RAN nodes $102_1$ and $102_2$, and a processing circuit $112_1$, $112_2$, $112_3$ . . . $112_n$ for processing signals transmitted from and received by the transceiver circuit $110_1$, $110_2$, $110_3$ . . . $110_n$ and for controlling the operation of the corresponding wireless device $104_1$, $104_2$, $104_3$ . . . $104_n$. The transceiver circuit $110_1$, $110_2$, $110_3$ . . . $110_n$ may include a transmitter $114_1$, $114_2$, $114_3$ . . . $114_n$ and a receiver $116_1$, $116_2$, $116_3$ . . . $116_n$, which may operate according to any standard, e.g., the GSM/EDGE standard. The processing circuit $112_1$, $112_2$, $112_3$ . . . $112_n$ may include a processor $118_1$, $118_2$, $118_3$ . . . $118_n$ and a memory $120_1$, $120_2$, $120_3$ . . . $120_n$ for storing program code for controlling the operation of the corresponding wireless device $104_1$, $104_2$, $104_3$ . . . $104_n$. The program code may include code for performing the procedures as described hereinafter with respect to FIGS. 3A-3B, 4.

Each RAN node $102_1$ and $102_2$ (wireless access node $102_1$ and $102_2$) may include a transceiver circuit $122_1$ and $122_2$ for communicating with wireless devices $104_1$, $104_2$, $104_3$ . . . $104_n$, a processing circuit $124_1$ and $124_2$ for processing signals transmitted from and received by the transceiver circuit $122_1$ and $122_2$ and for controlling the operation of the corresponding RAN node $102_1$ and $102_2$, and a network interface $126_1$ and $126_2$ for communicating with the core network 106. The transceiver circuit $122_1$ and $122_2$ may include a transmitter $128_1$ and $128_2$ and a receiver $130_1$ and $130_2$, which may operate according to any standard, e.g., the GSM/EDGE standard. The processing circuit $124_1$ and $124_2$ may include a processor $132_1$ and $132_2$, and a memory $134_1$ and $134_2$ for storing program code for controlling the operation of the corresponding RAN node $102_1$ and $102_2$. The program code may include code for performing the procedures as described hereinafter with respect to FIGS. 5-6.

The CN node 107 (e.g., SGSN 107, MME 107) may include a transceiver circuit 136 for communicating with the RAN nodes $102_1$ and $102_2$, a processing circuit 138 for processing signals transmitted from and received by the transceiver circuit 136 and for controlling the operation of the CN node 107, and a network interface 140 for communicating with the RAN nodes $102_1$ and $102_2$. The transceiver circuit 136 may include a transmitter 142 and a receiver 144, which may operate according to any standard, e.g., the GSM/EDGE standard. The processing circuit 138 may include a processor 146 and a memory 148 for storing program code for controlling the operation of the CN node 107. The program code may include code for performing the procedures as described hereinafter with respect to FIGS. 7-8.

Ready Timer Splitting Technique

Per the present disclosure, the period of the ready timer 150 is conceptually split into a first time period 158 (RTP1 158) and a second time period 160 (RTP2 160) where during RTP1 158, the periodicity of reachability (i.e., first periodicity of reachability 151) for the wireless device $104_2$ (for example) can be more frequent than the periodicity of reachability (i.e., the second periodicity of reachability 161) during RTP2 160. In one example, the wireless device $104_2$ (for example) upon completing an uplink transmission of uplink data blocks 152 will receive from the RAN node $102_2$ (for example) an EC-PUAN message 154 which indicates that all the uplink data blocks 152 have been received by the RAN node $102_2$. The EC-PUAN message 154 may also include an indicator 156 which indicates that the wireless device $104_2$ is to enter an EC-GSM Idle mode or an EC-GSM Extended Uplink TBF mode. Further, the EC-PUAN message 154 provides the wireless device $104_2$ with an indication 157 of the value of RTP1 158, where RTP1 158 is considered to have started when the ready timer 150 was started (i.e., when the wireless device $104_2$ determines it has successfully transmitted all uplink blocks 152). At the expiration of RTP1 158, the wireless device $104_2$ device immediately (e.g., without delay) starts RTP2 160 and transitions to the increased periodicity of reachability (i.e. second periodicity of reachability 161) associated with RTP2 160 (i.e., RTP1+RTP2=the ready timer period). As such, the RTP2 timer 160 will always expire at the same time the ready timer 150 expires. The following is a discussion about how the wireless device $104_2$ can operate per the present disclosure while in the EC-GSM Extended Uplink TBF mode and the EC-GSM Idle mode.

EC-GSM Extended Uplink TBF Mode

Upon the completion of uplink transmission of data blocks 152, and where the EC-PUAN message 154 indicates all data blocks 152 were received and that the wireless device 104₂ is to enter EC-GSM Extended Uplink TBF mode, the wireless device 104₂ remains on its assigned EC-Packet Data Traffic Channel (EC-PDTCH) resources and monitors the Downlink (DL) EC-Packet Associated Control Channel (EC-PACCH) (according to the device's coverage class) as follows (for example):

The wireless device 104₂ listens once every 8th instance of a 52-multiframe (~1.9 seconds) on the EC-PACCH starting with the first 52-multiframe after the 52-multiframe in which the wireless device 104₂ received the EC-PUAN message 154+mod(IMSI, 8) 52-multiframes, where IMSI is the wireless device's International Mobile Subscriber Identity.

If the wireless device 104₂ receives an EC-Packet Downlink Assignment (EC-PDA) message 162 on the EC-PACCH, the wireless device 104₂ establishes the corresponding downlink TBF where the wireless device 104₂ receives a set of DL data blocks 164 carrying an LLC PDU, which includes an application layer acknowledgement 166 which corresponds to the uplink data blocks 152. After sending the Packet Downlink Ack/Nack (PDAN) message 167 confirming reception of all DL data blocks 164, the wireless device 104₂ releases its EC-PDTCH resources and enters EC-GSM Idle mode where the wireless device 104₂ remains reachable according to its iDRX (Discontinuous Reception) cycle (discussed in EC-GSM Idle mode section) for the remainder of the ready timer 150. It is to be noted that the frequency of reachability in EC-GSM Idle mode is determined based on whether or not the RTP1 158 has expired.

If the RTP1 158 expires before a matching EC-PACCH message (i.e., EC-PDA 162) is received, then wireless device 104₂ enters EC-GSM Idle mode and transitions to the increased periodicity of reachability 161 (i.e., the second periodicity of reachability 161) associated with RTP2 160.

EC-GSM Idle Mode

Figure 2:
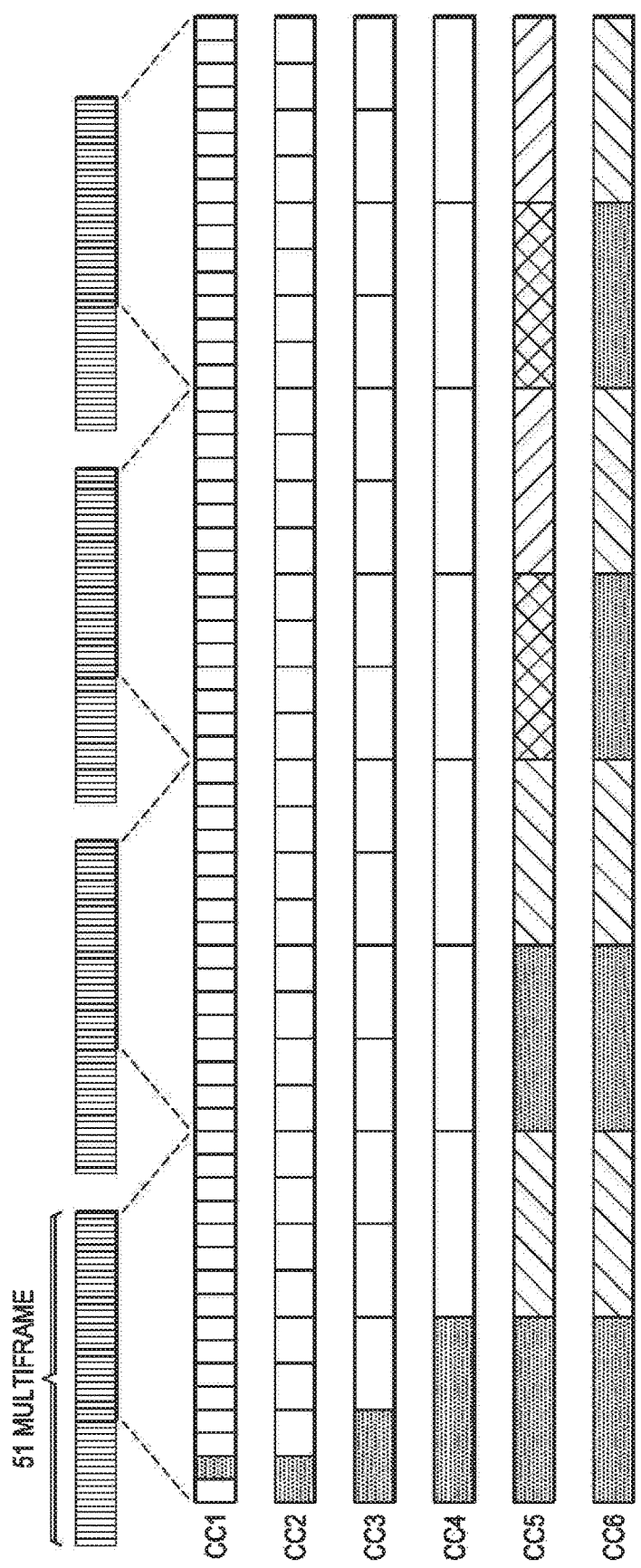
FIG. 2 is a diagram which shows coverage class specific paging groups for wireless devices that are used in describing an example of an embodiment of the present disclosure.

I. Upon entering EC-GSM Idle mode where RTP1 158 has not yet expired, the wireless device 104₂ starts monitoring the Access Grant Channel (AGCH) resources according to the wireless device's coverage class (assume Coverage Class 3 (CC3) in this discussion) where the wireless device 104₂ remains reachable according to an iDRX cycle length of 8 51-multiframes (~1.9 sec) as follows (for example):

The nominal paging group corresponding to a Coverage Class 1 (CC1) wireless device 104₃ (for example) is used as the basis for determining the set of EC-Paging Channel (EC-PCH) blocks actually read by a wireless device 104₁, 104₂, 104₃ . . . 104ₙ of a given coverage class during the iDRX cycle, as illustrated in FIG. 2 (which shows coverage class specific paging groups for this example).

N is the number of paging groups corresponding to the CC1 wireless device 104₃ (for example) within the iDRX cycle length=16*8=128 (i.e., 16 is the number of CC1 EC-PCH blocks per 51-multiframe, 8 is the number of 51-multiframes in one iDRX cycle).

The nominal paging group corresponding to the CC1 wireless device 104₃ (for example) for a given iDRX cycle=mod (IMSI, N). Considering the example of a CC3 wireless device 104₂ (for example), the CC1 row of FIG. 2 is first considered as it conceptually indicates which of the N=128 EC-PCH blocks (shaded blocks) per iDRX cycle would apply to the wireless device 104₂ if it was a CC1 wireless device. The Coverage Class 3 (CC3) row of FIG. 2 indicates the actual set of EC-PCH blocks (shaded blocks) comprising the nominal paging group of the CC3 wireless device 104₂ (for example).

If the wireless device 104₂ receives an EC-Immediate Assignment (EC-IA) message 168 on the EC-AGCH, the wireless device 104₂ establishes the corresponding downlink TBF where the wireless device 104₂ receives a set of DL data blocks 170 carrying an LLC PDU (e.g., including an application layer acknowledgement 172 which corresponds to the uplink data blocks 152).

After sending a PDAN message 174 confirming reception of all DL data blocks 170, the wireless device 104₂ releases its EC-PDTCH resources and enters EC-GSM Idle mode where the wireless device 104₂ remains reachable according to its iDRX cycle for the remainder of the ready timer 150 (note: that the frequency of reachability in EC-GSM Idle mode (i.e., the iDRX cycle) will be changed to the second periodicity of reachability 161 once RTP1 158 has expired).

II. Upon entering EC-GSM Idle mode where RTP1 158 has already expired but RTP2 160 has not yet expired or upon experiencing RTP1 158 timeout while in EC-GSM Idle mode, the wireless device 104₂ starts monitoring the AGCH resources according to the wireless device's coverage class (assume CC3 in this discussion) where the wireless device 104₂ remains reachable according to an iDRX cycle length of 32 51-multiframes (~7.5 sec) as follows (for example):

The nominal paging group corresponding to a CC1 wireless device 104₃ (for example) is used as the basis for determining the set of EC-PCH blocks actually read by a wireless device 104₁, 104₂, 104₃ . . . 104ₙ, of a given coverage class during the iDRX cycle, as illustrated in FIG. 2.

N is the number of paging groups corresponding to the CC1 wireless device 104₃ (for example) within the iDRX cycle length=16*32=512.

The nominal paging group corresponding to the CC1 wireless device 104₃ (for example) for a given iDRX cycle=mod (IMSI, N). Considering the example of a CC3 wireless device 104₂ (for example), the CC1 row of FIG. 2 is first considered as it conceptually indicates which of the N=512 EC-PCH blocks (shaded blocks) per iDRX cycle would apply to the wireless device 104₂ if it was a CC1 wireless device. The CC3 row of FIG. 2 indicates the actual set of EC-PCH blocks (shaded blocks) comprising the nominal paging group of the CC3 wireless device 104₂.

If the wireless device 104₂ receives an EC-Immediate Assignment (EC-IA) message 176 on the EC-AGCH, the wireless device 104₂ establishes the corresponding downlink TBF where the wireless device 104₂ receives a set of DL data blocks 178 carrying an LLC PDU (e.g., including the application layer acknowledgement 180 which corresponds to the uplink data blocks 152).

After sending the PDAN message 182 confirming reception of all DL data blocks 178, the wireless device 104₂ releases its EC-PDTCH resources and enters EC-GSM Idle mode where the wireless device 104₂ remains reachable according to its iDRX cycle for the remainder of the ready timer 150 (note: that the frequency of reachability in EC-GSM Idle mode (i.e., the iDRX cycle) will be changed to the second periodicity of reachability 161 once RTP1 158 has expired).

RAN Node 102₂ Processing of Network-Protocol Data Unit (N-PDU)

If the CN node 107 (e.g., SGSN 107) sends the RAN node 102₂ (e.g., BSS 102₂) an N-PDU 184 while the ready timer 150 is running for the corresponding wireless device 104₂ (for example), the CN node 107 includes an indication 186 of how much of the ready timer 150 has already elapsed for the corresponding wireless device 104₂. If the elapsed portion of the ready timer 150 is less than RTP1 158, the RAN node 102₂ will attempt to reach the wireless device 104₂ according to an iDRX cycle length of 8 51-multiframes (i.e., the first periodicity of reachability 151). Otherwise if the elapsed portion of the ready timer 150 is greater than RTP1 158, the RAN node 102₂ will attempt to reach the device according to an iDRX cycle length of 32 51-multiframes (i.e., the second periodicity of reachability 161). It is to be noted that the RAN node 102₂ can be expected to retain knowledge of the RTP1 value 158 that the RAN node 102₂ indicated within the EC-PUAN message 154 for at least as long as the period of the ready timer 150 of the corresponding wireless device 104₂.

Basic Functionalities-Configurations of CN Node 107 and RAN Node 102₂ (for Example)

Figure 3A:
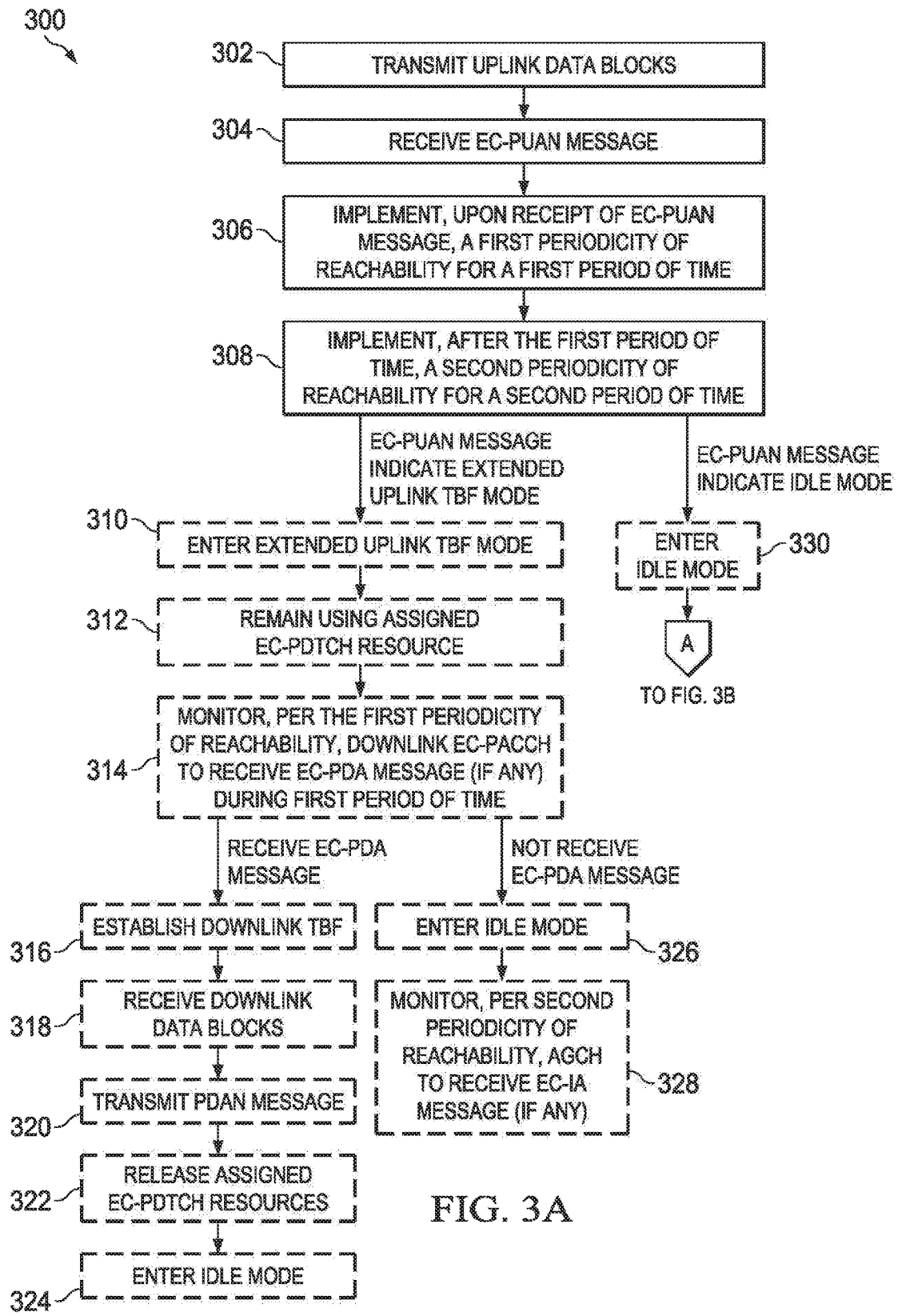
FIGS. 3A-3B are flowcharts of a method implemented in the wireless device in accordance with an embodiment of the present disclosure.
Figure 3B:
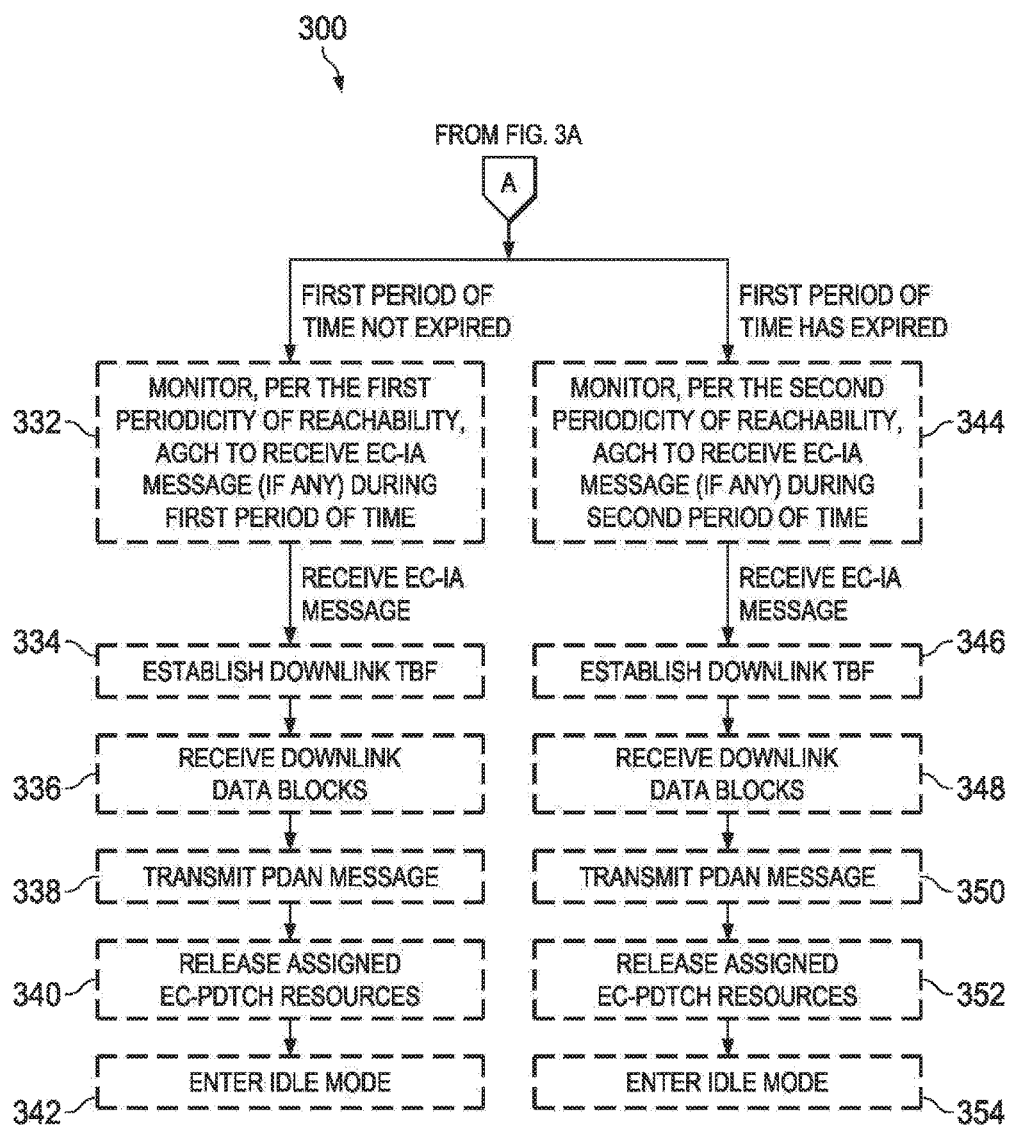

Referring to FIGS. 3A-3B, there are flowcharts of a method 300 implemented in the wireless device 104₂ (for example) in accordance with an embodiment of the present disclosure. At step 302, the wireless device 104₂ transmits uplink data blocks 152 to the RAN node 102₂. At step 304, the wireless device 104₂ receives from the RAN node 102₂ an EC-PUAN message 154 which indicates that all the uplink data blocks 152 have been received by the RAN node 102₂. In one example, the EC-PUAN message 154 further includes an indicator 156 which indicates that the wireless device 104₂ is to enter an EC-GSM Idle mode or an EC-GSM Extended Uplink TBF mode. In addition, the EC-PUAN message 154 provides the wireless device 104₂ with an indication 157 of the value of RTP1 158, where RTP1 158 is considered to have started when the ready timer 150 was started (i.e., when the wireless device 104₂ determines it has successfully transmitted all uplink blocks 152).

At step 306, the wireless device 104₂ implements, upon receipt of the EC-PUAN message 154, a first periodicity of reachability 151 (e.g., 8 51-multiframes (~1.9 sec)) for a first period of time 158 (e.g., RTP1 158).

At step 308, the wireless device 104₂ implements, after the first period of time 158, a second periodicity of reachability 161 (e.g., 32 51-multiframes (~7.5 sec)) for a second period of time 160 (e.g., RTP2 160). The first periodicity of reachability 151 is more frequent than the second periodicity of reachability 161. The sum of the first period of time 158 and the second period of time 160 is equal to a period of the ready timer 150 (e.g., RTP1 158+RTP2 161=ready timer 150). The ready timer 150 is associated with the wireless device 104₂ and is maintained (monitored) by both the wireless device 104₂ and the CN node 107.

At step 310, the wireless device 104₂ enters the extended uplink TBF mode (e.g., EC-GSM extended uplink TBF mode) when the EC-PUAN message 154 includes the indication 156 that the wireless device 104₂ is to enter the extended uplink TBF mode. Upon entering the extended uplink TBF mode per step 310, the wireless device 104₂ at step 312 remains using the assigned EC-PDTCH resources and at step 314 monitors, per the first periodicity of reachability 151 (e.g., 8 51-multiframes (~1.9 sec)), a downlink EC-PACCH to allow reception of an EC-PDA message 162, if any, intended for the wireless device 104₂. The wireless device 104₂ upon receiving the EC-PDA message 162 during the first period of time 158 at step 314 is operable to: (1) establish a downlink TBF (step 316); (2) receive a set of downlink data blocks 164 which includes an application layer acknowledgement 166 which is associated with the uplink data blocks 152 (step 318); (3) transmit a PDAN message 167 confirming receipt of the downlink data blocks 164 (step 320); (4) release the assigned EC-PDTCH resources (step 322); and, (5) enter idle mode where the wireless device 104₂ remains reachable according to its iDRX cycle for the remainder of the period of the ready timer 150 (step 324) (note: the wireless device 104₂ after entering the idle mode would monitor, per the first periodicity of reachability 151, an AGCH to allow reception of an EC-IA message, if any, intended for the wireless device 104₂ for the remainder of the first period of time 158 and after the first period of time 158 would monitor, per the second periodicity of reachability 161 (e.g., 32 51-multiframes (~7.5 sec)), an AGCH to allow reception of an EC-IA message, if any, intended for the wireless device 104₂). In contrast, the wireless device 104₂ upon not receiving the EC-PDA message 162 during the first period of time 158 at step 314 is operable to: (1) enter idle mode (step 326) (note: the wireless device 104₂ releases (not illustrated) the assigned EC-PDTCH resources prior to entering idle mode); and (2) monitor, per the second periodicity of reachability 161 (e.g., 32 51-multiframes (~7.5 sec)), an AGCH to allow reception of an EC-IA message, if any, intended for the wireless device (step 328).

At step 330, the wireless device 104₂ enters the idle mode (e.g., EC-GSM idle mode) when the EC-PUAN message 154 includes the indication 156 that the wireless device 104₂ is to enter the idle mode. Upon entering the idle mode per step 330, the wireless device 104₂ at step 332 monitors, per the first periodicity of reachability 151 (e.g., 8 51-multiframes (~1.9 sec)) when the first period of time 158 has not yet expired, an AGCH to allow reception of an EC-IA message 168, if any, intended for the wireless device 104₂. The wireless device 104₂ upon receiving the EC-IA message 168 during the first period of time 158 at step 332 is operable to: (1) establish a downlink TBF (step 334); (2) receive a set of downlink data blocks 170 including an application layer acknowledgement 172 which is associated with the uplink data blocks 152 (step 336); (3) transmit a PDAN message 174 confirming receipt of the downlink data blocks 170 (step 338); (4) release the assigned EC-PDTCH resources (step 340); and, (5) enter the idle mode where the wireless device 104₂ remains reachable for the remainder of the period of the ready timer 150 (step 342) (note: the wireless device 104₂ after entering the idle mode would monitor, per the first periodicity of reachability 151, an AGCH to allow reception of an EC-IA message, if any, intended for the wireless device 104₂ for the remainder of the first period of time 158 and after the first period of time 158 would monitor, per the second periodicity of reachability 161 (e.g., 32 51-multiframes (~7.5 sec)), an AGCH to allow reception of an EC-IA message, if any, intended for the wireless device 104₂). Alternatively, upon entering the idle mode per step 330, the wireless device 104₂ at step 344 monitors, per the second periodicity of reachability 161 (e.g., 32 51-multiframes (~7.5 sec)) and not the first periodicity of reachability 151 (e.g., 8 51-multiframes (~1.9 sec)) after the first period of time 158 has expired and until the second period of time 160 has expired, an AGCH to allow reception of an EC-IA message 176, if any, intended for the wireless device 104₂. The wireless device 104₂ upon receiving the EC-IA message 176 during step 344 is operable to: (1) establish a downlink TBF (step 346); (2) receive a set of downlink data blocks 178 including an application layer acknowledgement 180 which is associated with the uplink data blocks 152 (step 348); (3) transmit a PDAN message 182 confirming receipt of the downlink data blocks 178 (step 350); (4) release the assigned EC-PDTCH resources (step 352); and (5) enter the idle mode where the wireless device $104_2$ remains reachable for the remainder of the period of the ready timer 150 (step 354) (note: the wireless device $104_2$ after entering the idle mode and after the first period of time 158 would monitor, per the second periodicity of reachability 161 (e.g., 32 51-multiframes (~7.5 sec)), an AGCH to allow reception of an EC-IA message, if any, intended for the wireless device $104_2$). It should be noted that the other wireless devices $104_1$, $104_3$ ... $104_n$, may be configured in a similar manner to perform method 300 in the same manner as the wireless device $104_2$.

Figure 4:
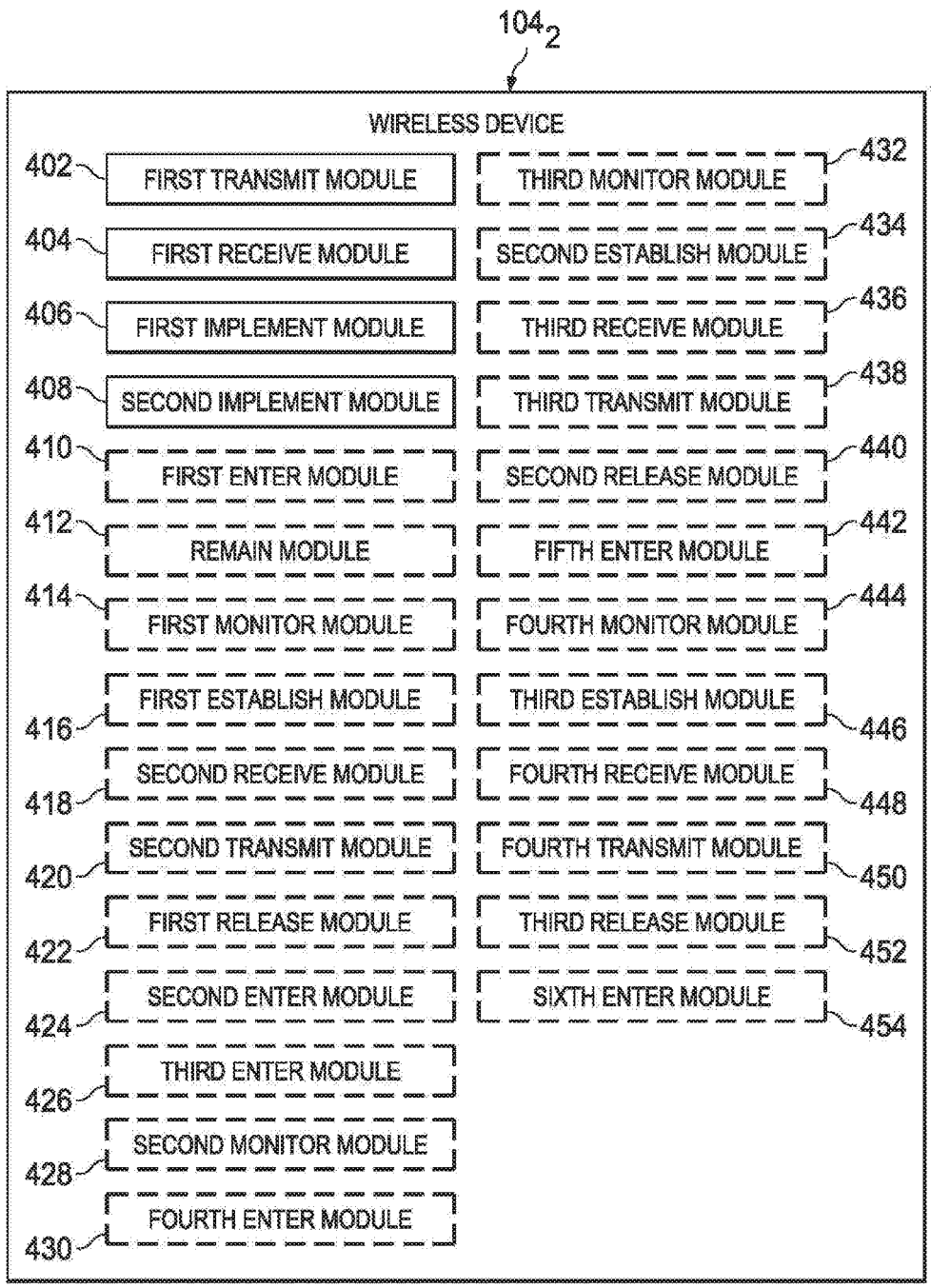
FIG. 4 is a block diagram illustrating an exemplary structure of the wireless device in accordance with an embodiment of the present disclosure.

Referring to FIG. 4, there is a block diagram illustrating structures of an exemplary wireless device $104_2$ (for example) in accordance with an embodiment of the present disclosure. In one embodiment, the wireless device $104_2$ comprises a first transmit module 402, a first receive module 404, a first implement module 406, a second implement module 408, a first enter module 410, a remain module 412, a first monitor module 414, a first establish module 416, a second receive module 418, a second transmit module 420, a first release module 422, a second enter module 424, a third enter module 426, a second monitor module 428, a fourth enter module 430, a third monitor module 432, a second establish module 434, a third receive module 436, a third transmit module 438, a second release module 440, a fifth enter module 442, a fourth monitor module 444, a third establish module 446, a fourth receive module 448, a fourth transmit module 450, a third release module 452, and a sixth enter module 454.

The first transmit module 402 is configured to transmit uplink data blocks 152 to the RAN node $102_2$. The first receive module 404 is configured to receive from the RAN node $102_2$ an EC-PUAN message 154 which indicates that all the uplink data blocks 152 have been received by the RAN node $102_2$. In one example, the EC-PUAN message 154 further includes an indicator 156 which indicates that the wireless device $104_2$ is to enter an EC-GSM Idle mode or an EC-GSM Extended Uplink TBF mode. In addition, the EC-PUAN message 154 provides the wireless device $104_2$ with an indication 157 of the value of RTP1 158, where RTP1 158 is considered to have started when the ready timer 150 was started (i.e., when the wireless device $104_2$ determines it has successfully transmitted all uplink blocks 152).

The first implement module 406 is configured to implement, upon receipt of the EC-PUAN message 154, a first periodicity of reachability 151 (e.g., 8 51-multiframes (~1.9 sec)) for a first period of time 158 (e.g., RTP1 158).

The second implement module 408 is configured to implement, after the first period of time 158, a second periodicity of reachability 161 (e.g., 32 51-multiframes (~7.5 sec)) for a second period of time 160 (e.g., RTP2 161). The first periodicity of reachability 151 is more frequent than the second periodicity of reachability 161. The sum of the first period of time 158 and the second period of time 160 is equal to a period of the ready timer 150 (e.g., RTP1 158+RTP2 160=ready timer 150).

The first enter module 410 is configured to enter the extended uplink TBF mode (e.g., EC-GSM extended uplink TBF mode) when the EC-PUAN message 154 includes the indication 156 that the wireless device $104_2$ is to enter the extended uplink TBF mode. Upon entering the extended uplink TBF mode, the remain module 412 is configured to remain using the assigned EC-PDTCH resources and the first monitor module 414 is configured to monitor, per the first periodicity of reachability 151 (e.g., 8 51-multiframes (~1.9 sec)), a downlink EC-PACCH to allow reception of an EC-PDA message 162, if any, intended for the wireless device $104_2$. The wireless device $104_2$ upon receiving the EC-PDA message 162 during the first period of time 158 is configured to: (1) establish a downlink TBF (first establish module 416); (2) receive a set of downlink data blocks 164 which includes an application layer acknowledgement 166 which is associated with the uplink data blocks 152 (second receive module 418); (3) transmit a PDAN message 167 confirming receipt of the downlink data blocks 164 (second transmit module 420); (4) release the assigned EC-PDTCH resources (first release module 422); and, (5) enter idle mode where the wireless device $104_2$ remains reachable according to its iDRX cycle for the remainder of the period of the ready timer 150 (second enter module 424) (note: the wireless device $104_2$ after entering the idle mode would monitor, per the first periodicity of reachability 151, an AGCH to allow reception of an EC-IA message, if any, intended for the wireless device $104_2$ for the remainder of the first period of time 158 and after the first period of time 158 would monitor, per the second periodicity of reachability 161 (e.g., 32 51-multiframes (~7.5 sec)), an AGCH to allow reception of an EC-IA message, if any, intended for the wireless device $104_2$)). In contrast, the wireless device $104_2$ upon not receiving the EC-PDA message 162 during the first period of time 158 is configured to: (1) enter idle mode (third enter module 426) (note: the wireless device $104_2$ releases (not illustrated) the assigned EC-PDTCH resources prior to entering idle mode); and (2) monitor, per the second periodicity of reachability 161 (e.g., 32 51-multiframes (~7.5 sec)), an AGCH to allow reception of an EC-IA message, if any, intended for the wireless device (second monitor module 428).

The fourth enter module 430 is configured to enter the idle mode (e.g., EC-GSM idle mode) when the EC-PUAN message 154 includes the indication 156 that the wireless device $104_2$ is to enter the idle mode. Upon entering the idle mode per the fourth enter module 430, the third monitor module 432 is configured to monitor, per the first periodicity of reachability 151 (e.g., 8 51-multiframes (~1.9 sec)) when the first period of time 158 has not yet expired, an AGCH to allow reception of an EC-IA message 168, if any, intended for the wireless device $104_2$. The wireless device $104_2$ upon receiving the EC-IA message 168 during the first period of time 158 is configured to: (1) establish a downlink TBF (second establish monitor 434); (2) receive a set of downlink data blocks 170 including an application layer acknowledgement 172 which is associated with the uplink data blocks 152 (third receive module 436); (3) transmit a PDAN message 174 confirming receipt of the downlink data blocks 170 (third transmit module 438); (4) release the assigned EC-PDTCH resources (second release module 440); and, (5) enter the idle mode where the wireless device $104_2$ remains reachable for the remainder of the period of the ready timer 150 (fifth enter module 442) (note: the wireless device $104_2$ after entering the idle mode would monitor, per the first periodicity of reachability 151, an AGCH to allow reception of an EC-IA message, if any, intended for the wireless device $104_2$ for the remainder of the first period of time 158 and after the first period of time 158 would monitor, per the second periodicity of reachability 161 (e.g., 32 51-multiframes (~7.5 sec)), an AGCH to allow reception of an EC-IA message, if any, intended for the wireless device $104_2$). Alternatively, upon entering the idle mode per the fourth enter module 430, the fourth monitor module 444 is configured to monitor, per the second periodicity of reachability 161 (e.g., 32 51-multiframes (~7.5 sec)) and not the first periodicity of reachability 151 (e.g., 8 51-multiframes (~1.9 sec)) after the first period of time 158 has expired and until the second period of time 160 has expired, an AGCH to allow reception of an EC-IA message 176, if any, intended for the wireless device $104_2$. The wireless device $104_2$ upon receiving the EC-IA message 176 is configured to: (1) establish a downlink TBF (third establish module 446); (2) receive a set of downlink data blocks 178 including an application layer acknowledgement 180 which is associated with the uplink data blocks 152 (fourth receive module 448); (3) transmit a PDAN message 182 confirming receipt of the downlink data blocks 178 (fourth transmit module 450); (4) release the assigned EC-PDTCH resources (third release module 452); and (5) enter the idle mode where the wireless device $104_2$ remains reachable for the remainder of the period of the ready timer 150 (sixth enter module 454) (note: the wireless device $104_2$ after entering the idle mode and after the first period of time 158 would monitor, per the second periodicity of reachability 161 (e.g., 32 51-multiframes (~7.5 sec)), an AGCH to allow reception of an EC-IA message, if any, intended for the wireless device $104_2$).

It should be noted that the wireless device $104_2$ may also include other components, modules or structures which are well-known, but for clarity, only the components, modules or structures needed to describe the features of the present disclosure are described herein. Further, it should be noted that the other wireless devices $104_1$, $104_3$ ... $104_n$, may be configured in a similar manner as the wireless device $104_2$.

As those skilled in the art will appreciate, the above-described modules 402, 404, 406, 408, 410, 412, 414, 416, 418, 420, 422, 424, 426, 428, 430, 432, 434, 436, 438, 440, 442, 444, 446, 448, 450, 452, and 454 of the wireless device $104_2$ may be implemented separately with suitable dedicated circuits. Further, the modules 402, 404, 406, 408, 410, 412, 414, 416, 418, 420, 422, 424, 426, 428, 430, 432, 434, 436, 438, 440, 442, 444, 446, 448, 450, 452, and 454 can also be implemented using any number of dedicated circuits through functional combination or separation. In some embodiments, the modules 402, 404, 406, 408, 410, 412, 414, 416, 418, 420, 422, 424, 426, 428, 430, 432, 434, 436, 438, 440, 442, 444, 446, 448, 450, 452, and 454 may be even combined in a single application specific integrated circuit (ASIC). As an alternative software-based implementation, the wireless device $104_2$ may comprise a memory $120_2$, a processor $118_2$ (including but not limited to a microprocessor, a microcontroller or a Digital Signal Processor (DSP), etc.) and a transceiver $110_2$. The memory $120_2$ stores machine-readable program code executable by the processor $118_2$ to cause the wireless device $104_2$ to perform the steps of the above-described method 300.

Referring to FIG. 5, there is a flowchart of a method 500 implemented in the RAN node $102_2$ (e.g., BSS $102_2$) configured to interact with the wireless device $104_2$ (for example) and the CN node 107 (e.g., SGSN 107) in accordance with an embodiment of the present disclosure. At step 502, the RAN node $102_2$ receives uplink data blocks 152 from the wireless device $104_2$. At step 504, the RAN node $102_2$ transmits to the wireless device $104_2$ an EC-PUAN message 154 which confirms receipt of the uplink data blocks 152. In one example, the EC-PUAN message 154 further includes an indicator 156 which indicates that the wireless device $104_2$ is to enter an EC-GSM Idle mode or an EC-GSM Extended Uplink TBF mode. In addition, the EC-PUAN message 154 provides the wireless device $104_2$ with an indication 157 of the value of RTP1 158, where RTP1 158 is considered to have started when the ready timer 150 was started (i.e., when the wireless device $104_2$ determines it has successfully transmitted all uplink blocks 152) (note: the RAN node $102_2$ stores the first period of time 158 (e.g., RTP1 158) for as long as the period of the ready timer 150 for the wireless device $104_2$). At step 506, the RAN node $102_2$ receives from the CN node 107 an N-PDU 184 associated with the wireless device $104_2$. In one example, the N-PDU 184 includes an indication 186 of how much time of the ready timer 150 has elapsed for the wireless device $104_2$. At step 508, the RAN node $102_2$ due to the receipt of the N-PDU 184 transmits a message 168 (EC-IA message 168) to the wireless device $104_2$ according to a first periodicity of reachability 151 (e.g., 8 51-multiframes (~1.9 sec)) for the wireless device $104_2$ using one of multiple transmission opportunities available until a first period of time 158 (e.g., RTP1 158) of the ready timer 150 has elapsed. For the case where the RAN node $102_2$ transmits the EC-IA message 168, FIG. 3B's steps 334, 336, 338, 340 and 342 illustrate exemplary signaling that can occur thereafter between the RAN node $102_2$ and the wireless device $104_2$ where the N-PDU 184 included the downlink data blocks 170. Alternatively at step 510, the RAN node $102_2$ due to the receipt of the N-PDU 184 transmits a message 176 (EC-IA message 176) to the wireless device $104_2$ according to a second periodicity of reachability 161 (e.g., 32 51-multiframes (~7.5 sec)) for the wireless device $104_2$ after the first period of time 158 (e.g., RPT1 158) of the ready timer 150 has elapsed and using one of multiple transmission opportunities available until the second period of time 161 (e.g., RTP2 161) of the ready timer 150 has elapsed. For the case where the RAN node $102_2$ transmits the EC-IA message 176, FIG. 3B's steps 346, 348, 350, 352 and 354 illustrate exemplary signaling that can occur thereafter between the RAN node $102_2$ and the wireless device $104_2$ where the N-PDU 184 included the downlink data blocks 178. It should be noted that depending on the elapsed time of the ready timer 150, the RAN node $102_2$ is going to transmit either message 168 per step 508 or message 176 per step 510. Also, it should be noted that the other RAN node $102_1$ may be configured to implement method 500 in the same manner as the RAN node $102_2$.

Referring to FIG. 6, there is a block diagram illustrating structures of an exemplary RAN node $102_2$ (e.g., BSS $102_2$) configured to interact with the wireless device $104_2$ (for example) and the CN node 107 (e.g., SGSN 107) in accordance with an embodiment of the present disclosure. In one embodiment, the RAN node $102_2$ comprises a first receive module 602, a first transmit module 604, a second receive module 606, a second transmit module 608, and a third transmit module 610. The first receive module 602 is configured to receive uplink data blocks 152 from the wireless device $104_2$. The first transmit module 604 is configured to transmit to the wireless device $104_2$ an EC-PUAN message 154 which confirms receipt of the uplink data blocks 152. In one example, the EC-PUAN message 154 further includes an indicator 156 which indicates that the wireless device $104_2$ is to enter an EC-GSM Idle mode or an EC-GSM Extended Uplink TBF mode. In addition, the EC-PUAN message 154 provides the wireless device $104_2$ with an indication 157 of the value of RTP1 158, where RTP1 158 is considered to have started when the ready timer 150 was started (i.e., when the wireless device $104_2$ determines it has successfully transmitted all uplink blocks 152) (note: the RAN node $102_2$ stores the first period of time 158 (e.g., RTP1 158) for as long as the period of the ready timer 150 for the wireless device 104₂). The second receive module 606 is configured to receive from the CN node 107 an N-PDU 184 associated with the wireless device 104₂. In one example, the N-PDU 184 includes an indication 186 of how much time of the ready timer 150 has elapsed for the wireless device 104₂. The second transmit module 608 due to the receipt of the N-PDU 184 is configured to transmit a message 168 (EC-IA message 168) to the wireless device 104₂ according to a first periodicity of reachability 151 (e.g., 8 51-multiframes (~1.9 sec)) for the wireless device 104₂ using one of multiple transmission opportunities available until a first period of time 158 (e.g., RTP1 158) of the ready timer 150 has elapsed. For the case where the second transmit module 608 transmits the EC-IA message 168, FIG. 3B's steps 334, 336, 338, 340 and 342 illustrate exemplary signaling that can occur thereafter between the RAN node 102₂ and the wireless device 104₂ where the N-PDU 184 included the downlink data blocks 170. Alternatively, the third transmit module 610 due to the receipt of the N-PDU 184 is configured to transmit a message 176 (EC-IA message 176) to the wireless device 104₂ according to a second periodicity of reachability 161 (e.g., 32 51-multiframes (~7.5 sec)) for the wireless device 104₂ after the first period of time 158 (e.g., RPT1 158) of the ready timer 150 has elapsed using one of multiple transmission opportunities available and until the second period of time 161 (e.g., RTP2 161) of the ready timer 150 has elapsed. For the case where the third transmit module 610 transmits the EC-IA message 176, FIG. 3B's steps 346, 348, 350, 352 and 354 illustrate exemplary signaling that can occur thereafter between the RAN node 102₂ and the wireless device 104₂ where the N-PDU 184 included the downlink data blocks 178. It should be noted that depending on the elapsed time of the ready timer 150, the RAN node 102₂ is going to transmit either message 168 or 176. It should be noted that the RAN node 102₂ may also include other components, modules or structures which are well-known, but for clarity, only the components, modules or structures needed to describe the features of the present disclosure are described herein. Further, it should be noted that the other RAN node 102₁ may be configured in a similar manner as the RAN node 102₂. As those skilled in the art will appreciate, the above-described modules 602, 604, 606, 608, and 610 of the RAN node 102₂ (e.g., BSS 102₂, NodeB 102₂, eNodeB 102₂) may be implemented separately with suitable dedicated circuit(s). Further, the modules 602, 604, 606, 608, and 610 can also be implemented using any number of dedicated circuits through functional combination or separation. In some embodiments, the modules 602, 604, 606, 608, and 610 may be even combined in a single application specific integrated circuit (ASIC). As an alternative software-based implementation, the RAN node 102₂ may comprise a memory 134₂, a processor 132₂ (including but not limited to a microprocessor, a microcontroller or a Digital Signal Processor (DSP), etc.) and a transceiver 122₂. The memory 134₂ stores machine-readable program code executable by the processor 132₂ to cause the RAN node 102₂ (e.g., BSS 102₂, NodeB 102₂, eNodeB 102₂) to perform the steps of the above-described method 500. It should be appreciated that the other RAN node 102₁ can also be configured in a similar manner as the RAN node 102₂ to perform method 500.

Referring to FIG. 7, there is a flowchart of a method 700 implemented in the CN node 107 (e.g., SGSN 107) configured to interact with the RAN node 102₂ (e.g., BSS 102₂) in accordance with an embodiment of the present disclosure. At step 702, the CN node 107 transmits to the RAN node 102₂ an N-PDU 184 associated with the wireless device 104₂, where the N-PDU 184 includes an indication 186 of how much time of the ready timer 150 has elapsed for the wireless device 104₂.

Referring to FIG. 8, there is a block diagram illustrating structures of an exemplary CN node 107 (e.g., SGSN 107) configured to interact with the RAN node 102₂ (e.g., BSS 102₂, NodeB 102₂, eNodeB 102₂) in accordance with an embodiment of the present disclosure. In one embodiment, the CN node 107 comprises a transmit module 802 configured to transmit to the RAN node 102₂ a N-PDU 184 associated with the wireless device 104₂, where the N-PDU 184 includes an indication 186 of how much time of the ready timer 150 has elapsed for the wireless device 104₂. It should be noted that the CN node 107 may also include other components, modules or structures which are well-known, but for clarity, only the components, modules or structures needed to describe the features of the present disclosure are described herein.

As those skilled in the art will appreciate, the above-described transmit module 802 of the CN node 107 (e.g., SGSN 107) may be implemented by a suitable dedicated circuit. Further, the transmit modules 802 can also be implemented using any number of dedicated circuits through functional combination or separation. In some embodiments, the transmit module 802 may be even combined in a single application specific integrated circuit (ASIC). As an alternative software-based implementation, the CN node 107 may comprise a memory 148, a processor 146 (including but not limited to a microprocessor, a microcontroller or a Digital Signal Processor (DSP), etc.) and a transceiver 136. The memory 148 stores machine-readable program code executable by the processor 146 to cause the CN node 107 (e.g., SGSN 107) to perform the steps of the above-described method 700.

In view of the foregoing, one skilled in the art will appreciate that the present disclosure discloses a ready timer 150 splitting feature which imposes a restricted reachability (compared to legacy operation) for a wireless device 104₂ (for example) while the particular wireless device's ready timer 150 is running which is desirable given the battery-limited nature of the wireless device 104₂ (for example). The ready timer 150 splitting feature described herein allows a wireless device 104₂ (for example) to be frequently reachable (e.g., once every 1.9 sec) for a RAN node 102₂ (e.g., BSS 102₂) determined by a limited time period (e.g., RPT1 158) starting from when a Mobile Autonomous Report (MAR) transmission (e.g., transmitted uplink data blocks 152) has been completed. This is done in the interest of minimizing the delay experienced by a wireless device 104₂ (for example) receiving a response 164, 170, 178 (e.g., an application layer acknowledgement 166, 172, 180) to its MAR transmission (e.g., transmitted uplink data blocks 152), while also ensuring that, at the end of the limited time period 158 (RPT1 158), battery consumption is not excessive for the remainder of the time period 160 (RPT2 160) spanned by the ready timer 150. It is to be noted that, in the interest of battery conservation, it is important to keep the time interval between a wireless device 104₂ (for example) completing the transmission of a MAR (e.g., transmitted uplink data blocks 152) and receiving a corresponding response 164, 170, 178 (e.g., an application layer acknowledgement 166, 172, 180) to be in the area of a few seconds (e.g., 1 or 2 seconds) to help reduce the probability of the application layer within the wireless device 104₂ timing out and resending the MAR transmissions.

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present disclosure may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure have been illustrated in the accompanying Drawings and described in the foregoing Detailed Description, it should be understood that the invention is not limited to the disclosed embodiments, but instead is also capable of numerous rearrangements, modifications and substitutions without departing from the present disclosure that as has been set forth and defined within the following claims.

The invention claimed is:

1. A wireless device comprising:
a processor; and
a memory that stores processor-executable instructions, wherein the processor interfaces with the memory to execute the processor-executable instructions, whereby the wireless device is operable to:
transmit uplink data blocks; and
receive an extended coverage packet uplink acknowledgment/non-acknowledgment (EC-PUAN) message,
wherein the EC-PUAN message includes an indication that the wireless device is to enter an extended uplink Temporary Block Flow (TBF) mode where the wireless device is further operable to: monitor, per a first periodicity of reachability for a first period of time, a downlink extended coverage packet associated control channel (EC-PACCH) to allow reception of an extended coverage packet downlink assignment (EC-PDA) message intended for the wireless device; and
wherein the wireless device upon failing to receive the EC-PDA message during the first period of time is operable to: enter an idle mode, and monitor, per a second periodicity of reachability for a second period of time, an extended coverage access grant channel (EC-AGCH).

2. The wireless device of claim 1, wherein the wireless device upon receiving the EC-PUAN message which indicates that all of the uplink data blocks have been successfully transmitted is further operable to start a ready timer and start a timer that determines the first period of time.

3. The wireless device of claim 1, wherein the first periodicity of reachability is more frequent than the second periodicity of reachability.

4. The wireless device of claim 1, wherein the first periodicity of reachability is same as the second periodicity of reachability.

5. The wireless device of claim 1, wherein a sum of the first period of time and the second period of time is equal to a period of a ready timer.

6. The wireless device of claim 1, wherein the wireless device is operable to monitor the EC-PACCH according to a coverage class of the wireless device.

7. The wireless device of claim 1, wherein the wireless device upon receiving the EC-PDA message during the first period of time is operable to:
establish a downlink TBF;
receive a set of downlink data blocks;
transmit an extended coverage packet downlink acknowledgment/non-acknowledgment (EC-PDAN) message confirming receipt of the downlink data blocks;
release assigned extended coverage packet data traffic channel (EC-PDTCH) resources; and
enter the idle mode.

8. The wireless device of claim 1, wherein the wireless device monitors, per the second periodicity of reachability for the second period of time, the EC-AGCH to allow reception of an extended coverage immediate assignment (EC-IA) message intended for the wireless device.

9. A method in a wireless device, the method comprising:
transmitting uplink data blocks; and
receiving an extended coverage packet uplink acknowledgment/non-acknowledgment (EC-PUAN) message,
wherein the EC-PUAN message includes an indication that the wireless device is to enter an extended uplink Temporary Block Flow (TBF) mode where the wireless device performs a step of monitoring, per a first periodicity of reachability for a first period of time, a downlink extended coverage packet associated control channel (EC-PACCH) to allow reception of an extended coverage packet downlink assignment (EC-PDA) message intended for the wireless device; and
wherein the wireless device upon failing to receive the EC-PDA message during the first period of time performs steps of entering an idle mode and, monitoring, per a second periodicity of reachability for a second period of time, an extended coverage access grant channel (EC-AGCH).

10. The method of claim 9, wherein the wireless device upon receiving the EC-PUAN message which indicates that all of the uplink data blocks have been successfully transmitted further performs steps of starting a ready timer and starting a timer that determines the first period of time.

11. The method of claim 9, wherein the first periodicity of reachability is more frequent than the second periodicity of reachability.

12. The method of claim 9, wherein the first periodicity of reachability is same as the second periodicity of reachability.

13. The method of claim 9, wherein a sum of the first period of time and the second period of time is equal to a period of a ready timer.

14. The method of claim 9, wherein the wireless device monitors the EC-PACCH according to a coverage class of the wireless device.

15. The method of claim 9, wherein the wireless device upon receiving the EC-PDA message during the first period of time further performs steps of:
- establishing a downlink TBF;
- receiving a set of downlink data blocks;
- transmitting an extended coverage packet downlink acknowledgment/non-acknowledgment (EC-PDAN) message confirming receipt of the downlink data blocks;
- releasing assigned extended coverage packet data traffic channel (EC-PDTCH) resources; and
- entering the idle mode.

16. The method of claim 9, wherein the wireless device monitors, per the second periodicity of reachability for the second period of time, the EC-AGCH to allow reception of an extended coverage immediate assignment (EC-IA) message intended for the wireless device.

17. A radio access network (RAN) node configured to interact with a wireless device, the RAN node comprising:
- a processor; and
- a memory that stores processor-executable instructions, wherein the processor interfaces with the memory to execute the processor-executable instructions, whereby the RAN node is operable to:
  - receive, from the wireless device, uplink data blocks; and
  - transmit, to the wireless device, an extended coverage packet uplink acknowledgment/non-acknowledgment (EC-PUAN) message,
  - wherein the EC-PUAN message includes an indication that the wireless device is to enter an extended uplink Temporary Block Flow (TBF) mode or an idle mode; and
  - wherein the RAN node is further operable when the wireless device is in the extended uplink TBF mode to transmit, per a first periodicity of reachability for the wireless device, an extended coverage packet downlink assignment (EC-PDA) message for the wireless device on a downlink extended coverage packet associated control channel (EC-PACCH).

18. The RAN node of claim 17, wherein the RAN node is further operable when the wireless device is in the idle mode to transmit, per a second periodicity of reachability for the wireless device, an extended coverage immediate assignment (EC-IA) message for the wireless device on an extended coverage access grant channel (EC-AGCH).

19. The RAN node of claim 18, wherein the first periodicity of reachability is more frequent than the second periodicity of reachability.

20. A method in a radio access network (RAN) node configured to interact with a wireless device, the method comprising:
- receiving, from the wireless device, uplink data blocks; and
- transmitting, to the wireless device, an extended coverage packet uplink acknowledgment/non-acknowledgment (EC-PUAN) message,
- wherein the EC-PUAN message includes an indication that the wireless device is to enter an extended uplink Temporary Block Flow (TBF) mode or an idle mode; and,
- wherein the RAN node when the wireless device is in the extended uplink TBF mode performs a step of transmitting, per a first periodicity of reachability for the wireless device, an extended coverage packet downlink assignment (EC-PDA) message for the wireless device on a downlink extended coverage packet associated control channel (EC-PACCH).

21. The method of claim 20, wherein the RAN node when the wireless device is in the idle mode performs a step of transmitting, per a second periodicity of reachability for the wireless device, an extended coverage immediate assignment (EC-IA) message for the wireless device on an extended coverage access grant channel (EC-AGCH).

22. The RAN node of claim 21, wherein the first periodicity of reachability is more frequent than the second periodicity of reachability.

* * * * *